(12) United States Patent
Ramirez et al.

(10) Patent No.: US 10,756,921 B2
(45) Date of Patent: Aug. 25, 2020

(54) SYSTEMS AND METHODS FOR TRAINING NETWORK-CONNECTED OBJECTS TO PROVIDE CONFIGURATIONS IN ASSOCIATION WITH EVENTS WITHIN MEDIA ASSETS

(71) Applicant: Rovi Guides, Inc., San Jose, CA (US)

(72) Inventors: Maria Rocio Ramirez, Belmont Hills, PA (US); Denisse Breaux, Lansdale, PA (US); Angel Merced, Wilmington, DE (US)

(73) Assignee: ROVI GUIDES, INC., San Jose, CA (US)

( * ) Notice: Subject to any disclaimer, the term of this patent is extended or adjusted under 35 U.S.C. 154(b) by 105 days.

(21) Appl. No.: 15/937,695

(22) Filed: Mar. 27, 2018

(65) Prior Publication Data

US 2019/0305978 A1  Oct. 3, 2019

(51) Int. Cl.
| | |
|---|---|
| *H04L 12/28* | (2006.01) |
| *H04N 21/478* | (2011.01) |
| *H04N 21/472* | (2011.01) |
| *H04N 21/422* | (2011.01) |
| *H04N 21/482* | (2011.01) |
| *G06N 20/00* | (2019.01) |

(52) U.S. Cl.
CPC .......... *H04L 12/282* (2013.01); *G06N 20/00* (2019.01); *H04L 12/2829* (2013.01); *H04N 21/42206* (2013.01); *H04N 21/478* (2013.01); *H04N 21/47205* (2013.01); *H04N 21/4821* (2013.01)

(58) Field of Classification Search
CPC .............. H04L 12/282; H04L 12/2829; H04N 21/4821; H04N 21/42206; H04N 21/47205; H04N 21/478; G06N 99/005; G06N 20/00
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |

(Continued)

*Primary Examiner* — Benjamin R Bruckart
*Assistant Examiner* — Aklil M Tesfaye
(74) *Attorney, Agent, or Firm* — Haley Guiliano LLP

(57) ABSTRACT

Systems and methods for training network-connected objects to provide configurations in association with events within media assets. A respective configuration setting of a network-connected object and a baseline biometric state of a user may be stored in a database for each event within a media asset. An event within a media asset (for display) may be detected. In response, a command may be sent to the network-connected object to implement the respective configuration setting. A determination may be made whether the user adjusts the respective configuration setting to a new configuration setting within a predefined time of the event. A biometric state of the user may be retrieved from a biometric device in response to the adjustment to a new configuration setting. If the biometric state does not correspond to the baseline biometric state, the respective configuration setting may be replaced with the new configuration setting.

22 Claims, 9 Drawing Sheets

(56) References Cited

U.S. PATENT DOCUMENTS

| | | |
|---|---|---|
| 2003/0097659 A1 | 5/2003 | Goldman |
| 2005/0251827 A1 | 11/2005 | Ellis et al. |
| 2009/0112695 A1 | 4/2009 | Jung et al. |
| 2010/0153885 A1 | 6/2010 | Yates |
| 2014/0244710 A1 | 8/2014 | Shuman et al. |
| 2014/0265497 A1* | 9/2014 | Hough ................ A61G 5/14 |
| | | 297/316 |
| 2015/0029087 A1* | 1/2015 | Klappert ............. G06F 3/015 |
| | | 345/156 |
| 2015/0319168 A1* | 11/2015 | McCarty ........... H04L 63/0861 |
| | | 713/186 |
| 2016/0286244 A1 | 9/2016 | Chang et al. |
| 2016/0381415 A1* | 12/2016 | Vijay ............. H04N 21/44218 |
| | | 725/12 |
| 2017/0020438 A1* | 1/2017 | Wang ................ A61G 7/057 |
| 2017/0257664 A1 | 9/2017 | Tam et al. |
| 2017/0272815 A1* | 9/2017 | Yan ................ G08B 21/0446 |

* cited by examiner

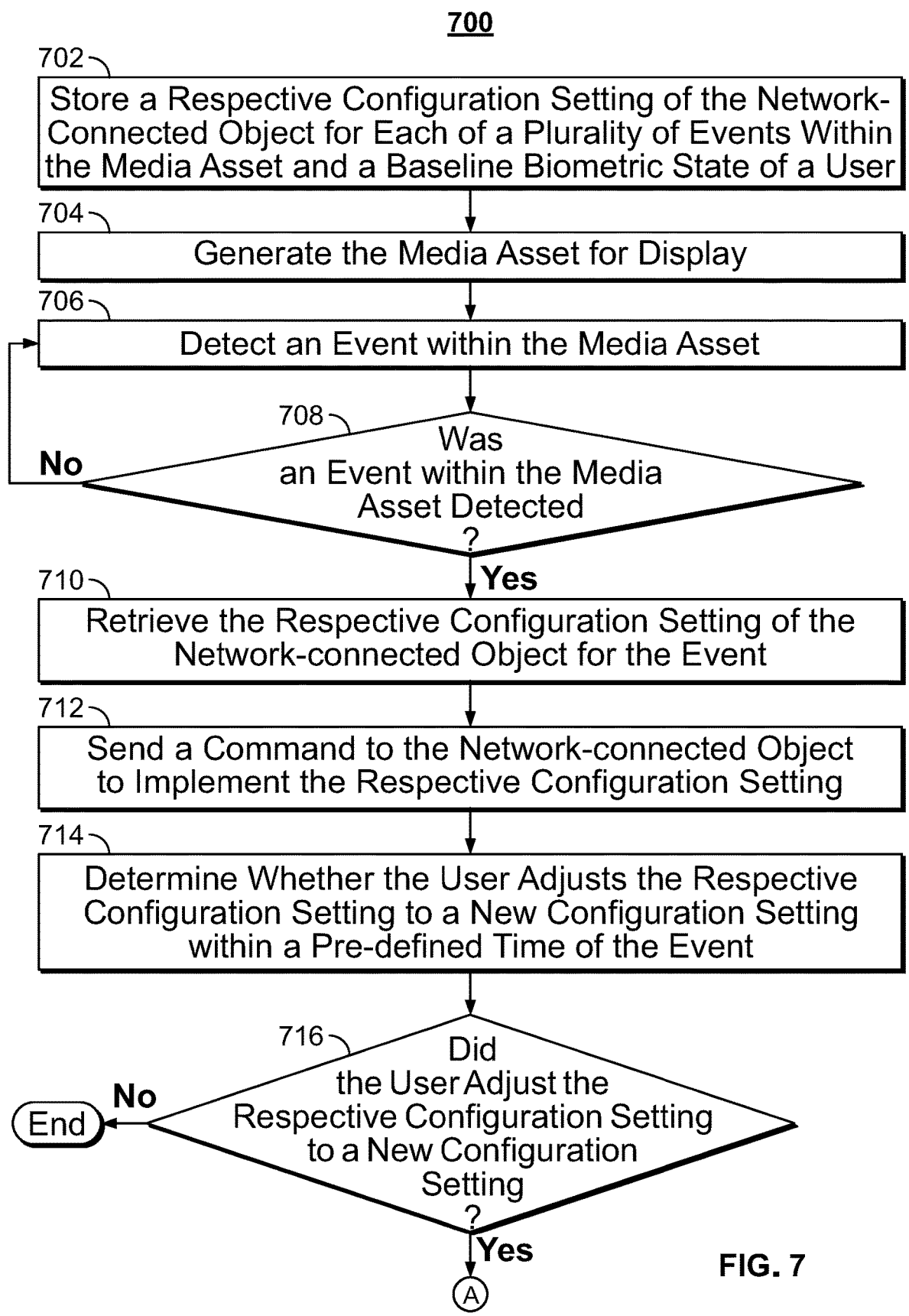

SYSTEMS AND METHODS FOR TRAINING NETWORK-CONNECTED OBJECTS TO PROVIDE CONFIGURATIONS IN ASSOCIATION WITH EVENTS WITHIN MEDIA ASSETS

BACKGROUND

There are many media devices available to users, each capable of providing media content. Furthermore, implementation of "smart" devices (i.e., devices integrated with processors and able to perform simple computer functions) is now ubiquitous. For example, chairs may store a user's preferred setting (i.e., the amount of recline that a user prefers when watching television). Lighting may include custom dimming such that a room is dimmed to a user's preferred level when watching television. Likewise, set-top boxes and other devices that receive and/or upon which users enjoy content (e.g., tablets, smartphones, etc.) may implement media guidance functions that aim to determine what a user prefers to watch (e.g., provide recommendations) or provide other functions with respect to media guidance data. With devices continually offering increasing features and functions, a need exists to coordinate between the numerous "smart" features. While minimal coordination can be achieved through some short-range communication techniques (e.g., Bluetooth pairing), providing more advanced coordination, particularly between devices with diverse features and functions that may be wholly distinct and incompatible with features and functions of other devices, has not been possible.

SUMMARY

To improve coordination between distinct smart devices, and in particular, smart devices that provide diverse features and functions, methods and systems are disclosed herein for applications that implement Internet of Things (IoT) technology to provide more robust communications between one or more network-connected objects within a network. This robust structure allows for applications to overcome the current barriers to coordinating the diverse features and functions of different devices.

One example of an application using IoT technology to coordinate devices is in the context of alerts during media asset events. For example, in addition to devices upon which a user consumes media (e.g., televisions, tablets, computers, etc.), there are other network-connected objects or devices that users may utilize during playback of media content. For example, a user may be sitting in a network-connected chair while watching media content being displayed from a digital video recorder. Users may react to certain events in the media content being displayed which requires an adjustment to the settings of the network-connected object. As the user reacts to an event in the media content being displayed, the user may have to manually adjust settings of the network-connected object to enjoy the event (e.g., a chair may need to be moved out of a reclined position during an event in a media asset). If a user becomes too distracted in manually adjusting the settings of the network-connected objects during display of media content, especially during specific events, the user may miss important parts of the media content. Application of IoT technology to these problems allows for applications to communicate with each other to better coordinate.

For example, the smart chair may be programmed to automatically adopt particular configurations (e.g., change from a reclined to an upright position) in response to a prompt from another device (e.g., a set-top box detecting an event in a media asset). However, even with this coordination, yet another problem exists. For example, the network-connected object may be initially programmed with settings that adjust configurations upon an event, but not to the user's preferences. If the settings of the network-connected objects do not adjust to the settings in accordance with user preferences, then the enjoyment of the media content by the user is adversely affected. Furthermore, simply querying the user about the numerous potential events that may occur and the particular configuration (of which there may also be numerous and for which the user may have no way of adequately describing) may be tedious to the user. Thus, even after applying IoT technology to smart devices to overcome current barriers to coordinating the diverse features and functions of different devices, these systems still fail to account for how to automatically determine configurations for IoT devices based on events in media assets and a user's preferred configuration of that IoT device in response to a predicted event.

Accordingly, to overcome the problems created when network-connected objects are not configured with user preferences in relation to events within media content systems, systems and methods are described herein for training network-connected objects to apply respective configuration settings in association with events within media assets. Furthermore, as opposed to conventional methods of querying a user, the systems and methods described herein use biometric data to train network-connected objects to apply respective configuration settings in association with events within media assets. Specifically, the media guidance application may store a respective configuration setting of a network-connected object in a database for each event within the media asset. A baseline biometric state of a user may also be stored in the database by the media guidance application. The media guidance application may detect an event within a media asset for display. In response, the media guidance application may send a command to the network-connected object to implement the respective configuration setting. The media guidance application may determine whether the user adjusts the respective configuration setting to a new configuration setting within a pre-defined time of the event. The media guidance application may retrieve a biometric state of the user from a biometric device in response to the adjustment to a new configuration setting. If the biometric state does not correspond to the baseline biometric state, the respective configuration setting may be replaced with the new configuration setting.

Accordingly, the network-connected object is trained for events in a media asset through user preferences and biometric states such that the user need not manually adjust the settings of the network-connected object in reaction to a particular event being displayed within the media asset. The system described does not necessitate user input, meaning such a technique is not tedious for a user to program each network-connected object. Another benefit derived from the system described is that the network-connected device need not have particular labeled configurations in an effort to accommodate the most frequent user requests; rather, the system described provides for configuration settings for each particular user, based on biometric states of the user, and other information relating to the user. False positives are also mitigated by implementing the described system, as the media guidance application trains the network-connected objects with biometric states of a user.

As an example, a media guidance application on a DVR displays a hockey game. The user is watching the hockey game in a recliner chair that is network-connected and is currently in a reclined state. The user also has a smartwatch (i.e., network-enabled watch) on their person, which measures their heart rate. The media guidance application detects that one team has scored a goal within the hockey game. The smartwatch provides the media guidance application with information about the user's heart rate. If the user's heart rate rises during the scoring of the goal (e.g., exceeding a baseline biometric state), the media guidance application will send a command to the recliner chair to implement a setting to adjust the recliner chair to an upright setting (e.g., a respective configuration setting for the event of a goal scored). Accordingly, as the current state of the recliner chair in the reclined configuration is obstructing the user's ability to stand and cheer, the user need not manually configure the recliner chair back to an upright configuration; rather, the media guidance application provides for an automatic change in the network-connected recliner chair based on the change in baseline biometrics in relation to the goal being scored in the hockey game being displayed by the media guidance application.

In some embodiments, a respective configuration setting, of a plurality of configuration settings, of a network-connected object for each of a plurality of events within a media asset and a baseline biometric state of a user may be stored in a database by the media guidance application. For example, a respective configuration setting of a network-connected recliner chair is stored by the media guidance application in a database. The respective configuration setting of the recliner is for each event within a tennis match featuring tennis players Rafael Nadal against Roger Federer. Additionally, the baseline heart rate of the user associated with the media guidance application is stored by the media guidance application within the same database. By storing the respective configuration settings of the network-connected object, the database provides for enhanced preferences for the user with respect to each event within a media asset to enhance training of the network-connected object.

The media guidance application may generate a display of the media asset. For example, the media guidance application generates display of the tennis match featuring Rafael Nadal versus Roger Federer.

The media guidance application may detect an event within the media asset. For example, the media guidance application detects a winning set point by Rafael Nadal in the tennis match.

In response to detecting the event within the media asset, the respective configuration setting of the network-connected object for the event may be retrieved by the media guidance application from the database. For example, the media guidance application will detect the set point won by Rafael Nadal and retrieve the respective configuration setting for the recliner chair for this particular event—namely, adjusting the recliner such that the cup holder tension is increased to prevent spillage of the beverage in anticipation of potential jostling of the recliner caused by user excitement. By retrieving the respective configuration setting of the network-connected object from the database, the media guidance application updates the network-connected object with a respective configuration setting, which is required for later determination of whether to alter the respective configuration setting to a new configuration setting.

In response to detecting the event within the media asset, the media guidance application may send a command to the network-connected object to implement the respective configuration setting. For example, the media guidance application will send a command to the recliner chair to implement the increase of tension of the cup holder. By implementing the respective configuration setting on the network-connected object, the media guidance application adjusts the network-connected object in response to the event to provide an enhanced user experience to the user (e.g., in this scenario, where the user may become very excited and potentially knock the cup out of the beverage holder, the increased tension of the cup holder ensures a firmer grip on the drink to avoid any potential spillage).

In response to detecting the event within the media asset, the media guidance application (e.g., implemented on the user equipment) may send a command to the network-connected object to implement the respective configuration setting. For example, the media guidance application will send a command to the recliner chair to implement the increased tension of the cup holder in the recliner chair. Once again, by implementing the respective configuration setting on the network-connected object, the network-connected object adjusts in response to the event to provide an enhanced user experience to the user.

In response to detecting the event within the media asset, the media guidance application determines whether the user adjusts the respective configuration setting to a new configuration setting within a predefined time of the event. The new configuration setting is one of a plurality of configuration settings. For example, as previously stated, the media guidance application will send a command to the recliner chair to implement the increase of cup holder tension. If the user reached for the beverage within a predefined time of 5 seconds after the set point is won by Rafael Nadal and forces the beverage out of the cup holder, the user effectively adjusted the respective configuration setting (increased tension to prevent spillage) to a new configuration setting (wiggled to reduce tension to access cup). By determining whether the user adjusted the network-connected object to a new configuration setting within a predefined time threshold, further information is gathered for training the network-connected object to apply the correct respective configuration setting with respect to the particular event.

In response to detecting the event within the media asset, and in further response to a determination that the user adjusted the respective configuration setting within a predefined time, the media guidance application retrieves a biometric state of the user from a biometric device. For example, the user may be wearing a smartwatch on his wrist (e.g., a wearable technology device), which has the capability of measuring the user's heart rate. During the set point won by Rafael Nadal, the media guidance application retrieves the user's heart rate from the smartwatch. By determining the biometric state in response to the detection of the event, the biometric state can be used as an additional variable to determine accuracy of respective configuration setting selection to ensure user engagement rather than an occurrence unrelated to the media asset. This mitigates the occurrence of false positives, as false positives are more common when commands to network-connected devices are issued solely based on event determination lacking additional variables (e.g., biometrics).

In response to detecting the event within the media asset, the media guidance application may determine whether the biometric state corresponds to the baseline biometric state. For example, the user's heart rate in response to the event is compared to the baseline user heart rate. Once again, a comparison between biometric state values can provide an additional variable to determine accuracy of respective configuration setting selection to ensure user engagement rather than an occurrence unrelated to the media asset.

In response to detecting the event within the media asset, and in further response to a determination that the biometric state does not correspond to the baseline biometric state, the media guidance application replaces the respective configuration setting with the new configuration setting. For example, if the user's heart rate is 80 beats per minute as a baseline biometric state, and in response to Rafael Nadal winning set point, the user's heart rate is 100 beats per minute, then the baseline biometric state heart rate does not correspond to the heart rate measured in response to the winning set point. The media guidance application provides an adjustment to the respective configuration setting based on a comparison of biometric state of the user; this provides for enhanced training of the network-connected object by ensuring a more accurate storage of respective configuration settings in response to a particular event.

In some embodiments, in response to a determination that the biometric state does not correspond to the baseline biometric state in the database, a record may be increased (e.g., incremented). The record pertains to the number of times the user adjusted the respective configuration setting to a new configuration setting within the predefined time. Additionally, a determination is made by the media guidance application, for the event, of whether the increased record exceeds a threshold number. The respective configuration setting is replaced with the new configuration setting in response to the media guidance application determining that the increased record exceeds a threshold number. For example, if the record threshold number is 2, and if Rafael Nadal wins a first set point and the user adjusts the recliner chair to an upright position from a previous reclined position within 5 seconds of the set point, the media guidance application will not update the respective configuration setting in the database. However, if Rafael Nadal wins a second set point and the user adjusts the recliner chair to an upright position from a previous reclined position within 5 seconds of the second set point, then the record threshold is met, and the media guidance application stores the respective configuration setting in the database as configuring the chair to be upright upon any future set point being won by Rafael Nadal for the current user. By implementing a record requiring a threshold number, this reduces the possibility of false positives where in some cases the deviation between the user's biometric state and baseline biometric state is not responsive to the event, rather it may be unrelated; thus, by having a threshold number, this ensures that a sufficient number of events occur before an updating of a new respective configuration setting in association with the event.

In some embodiments, in response to a determination that the biometric state does correspond to the baseline biometric state in the database, a record may not be increased. For example, if Rafael Nadal wins a second set point but the user's heart rate in response to the win of the second set point corresponds to the baseline biometric state, then the media guidance application does not increase the record and does not update the respective configuration setting. Once again, by implementing a record requiring a threshold number, this reduces the possibility of false positives.

In some embodiments, the predefined time of the event may be determined by inputting the event into a database of time thresholds for the user for different events to determine the predefined time corresponding to the event and the user. For example, the media guidance application may put a set winning point by Rafael Nadal into a database which returns a predefined time of the event to be 5 seconds. By implementing a predefined time of the event, a more accurate system to capture user reaction in response to an event may be achieved to more effectively train a network-connected object.

In some embodiments, the predefined time of the event may be determined by inputting the event into a database of time thresholds, for the baseline biometric state of the user, for different events to determine the predefined time corresponding to the event and the baseline biometric state of the user. For example, the media guidance application input the event of a set winning point by Rafael Nadal into a database which would return a predefined time of the event to be 5 seconds and 80 beats per minute corresponding baseline biometric state of the user. By implementing a predefined time of the event with a biometric state of the user, a more accurate system may be achieved which considers biometric variables for events to more effectively train a network-connected object.

In some embodiments, each of the plurality of configuration settings may correspond to a respective state of the network-connected object in which the network-connected object existed for a threshold period of time after connection to a network of the user. For example, the recliner chair may have various configuration settings including, but not limited to, fully reclined, midway reclined, and upright. Each of these configuration settings corresponds to a respective state of the recliner chair once the chair is connected to the network with the media guidance application. By implementing a network-connected object existing for a threshold period of time within a state, this serves to define states of the object, which, in turn, provides the information needed to train the network-connected object.

In some embodiments, determining that the network-connected object may have existed in each of the respective states for the threshold period of time further comprises monitoring for a user input entered by the user into the network-connected object. Additionally, the media guidance application determines that the user input entered by the user may have resulted in a state of the network-connected object. Finally, a length of time may be recorded by the media guidance application until a subsequent user input entered by the user may result in a new state of the network-connected object. For example, the recliner chair is left in a reclined position. A user configures the recliner such that the recliner returns to an upright position. If the user leaves the chair in an upright position for more than 1 minute, the media guidance application determines that the chair is currently configured in an upright state. By implementing a determination of user input and recording a length of time to satisfy a network-connected object state requirement, a clear definition of states of a network-connected object can be determined, which is used for training the network-connected object.

In some embodiments, determining that the network-connected object existed in each of the respective states for the threshold period of time further comprises monitoring for a user input entered by the user into the network-connected object. Additionally, the media guidance application determines that the user input entered by the user resulted in a state of the network-connected object. For example, the recliner chair is left in a reclined position. A user configures the recliner such that the recliner returns to an upright position. If the user leaves the chair in an upright position for 2 minutes, the media guidance application determines that the chair is configured in an upright state. Once again, by determining the network-connected object remains in a new orientation for a threshold amount of time provides further clarity of states of a network-connected object which is used for training the network-connected object.

In some embodiments, each of the plurality of configuration settings may correspond to mechanical changes in an orientation of the network-connected object. For example, the recliner chair mechanically alters, either through instruction from the media guidance application or user adjustment, its configuration from a reclined position to an upright position. The changes between these two configurations necessitate mechanical changes. By implementing mechanical changes in an orientation of the network-connected object, distinct states of the network-connected object can be determined, which is used for training the network-connected object.

In some embodiments, each of the plurality of configuration settings may be designated as one of the plurality of configuration settings by the user. For example, the user may program (e.g., through an electronic application) the network-connected object such that the configuration settings are designated by the user. The user may wish to set the recliner chair to always have the respective configuration setting as upright, irrespective of the type of event within the tennis match. By implementing user-designated configuration settings, the network-connected object is programmed with the corresponding respective configuration setting associated with an event.

It should also be noted that the systems and/or methods described above may be applied to, or used in accordance with, other systems and/or methods.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for training network-connected objects to provide configurations in association with events within media assets. A media guidance application stores a respective configuration setting of a network-connected object and a baseline biometric state of a user in a database for each event within a media asset. An event within a media asset (for display) may be detected by the media guidance application. In response, a command may be sent from the media guidance application to the network-connected object to implement the respective configuration setting. The media guidance application determines whether the user adjusts the respective configuration setting to a new configuration setting within a predefined time of the event. A biometric state of the user may be retrieved by the media guidance application from a biometric device in response to the adjustment to the new configuration setting. If the biometric state does not correspond to the baseline biometric state, the media guidance application may replace the respective configuration setting with the new configuration setting.

Figure 1A:
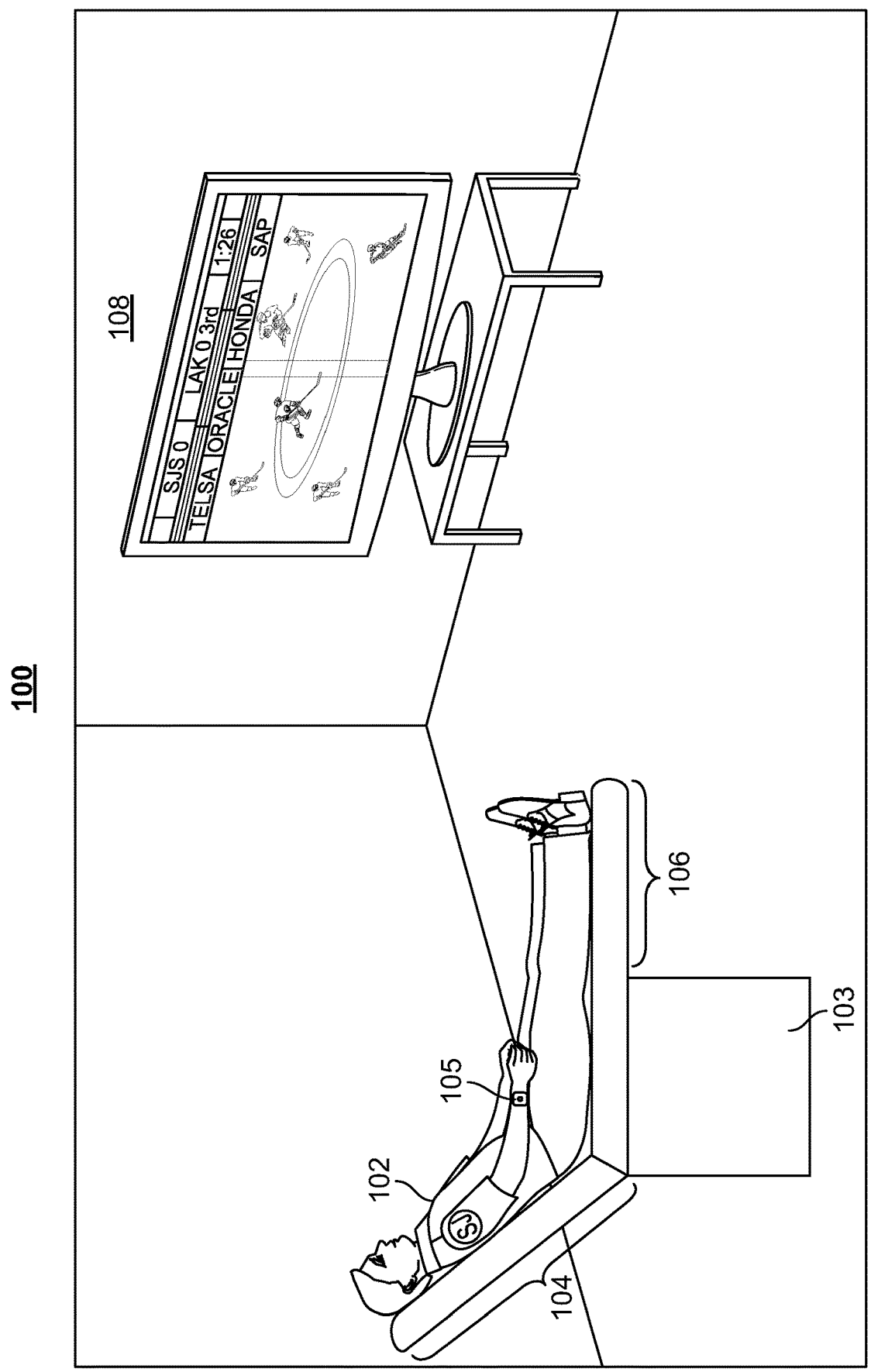
FIG. 1A shows an illustrative embodiment of a user watching a media asset whilst interacting with a network-connected object at a first time period.

FIG. 1A shows an illustrative embodiment 100 of a user watching a media asset whilst interacting with a network-connected object at a first time period, in accordance with some embodiments of the disclosure. FIG. 1A depicts user equipment 108, which may include control circuitry that executes a media guidance application on any user equipment. The functionality of the user equipment, control circuitry, and the media guidance application is described in further detail below with respect to FIGS. 2-5.

The media guidance application may generate for display a media asset (e.g., a hockey game) on user equipment 108 for a user 102 in environment 100. The user 102 is in a relaxed state watching the hockey game in a relaxed posture. The user 102 is wearing a biometric device 105 (e.g., a smartwatch with heart rate sensor). The user's heart rate is at a baseline biometric state in environment 100. A network-connected object 103 (e.g., a network-connected recliner chair) is in the environment 100 and connected to the media guidance application. The recliner chair has configuration settings which may be adjusted in many implementations, for example here by illustration, an upper portion 104 and a lower portion 106, which both adjust based on the level of recline. In environment 100, the upper portion 104 and lower portion 106 of the recliner chair 103 are at full recline configuration settings.

Figure 1B:
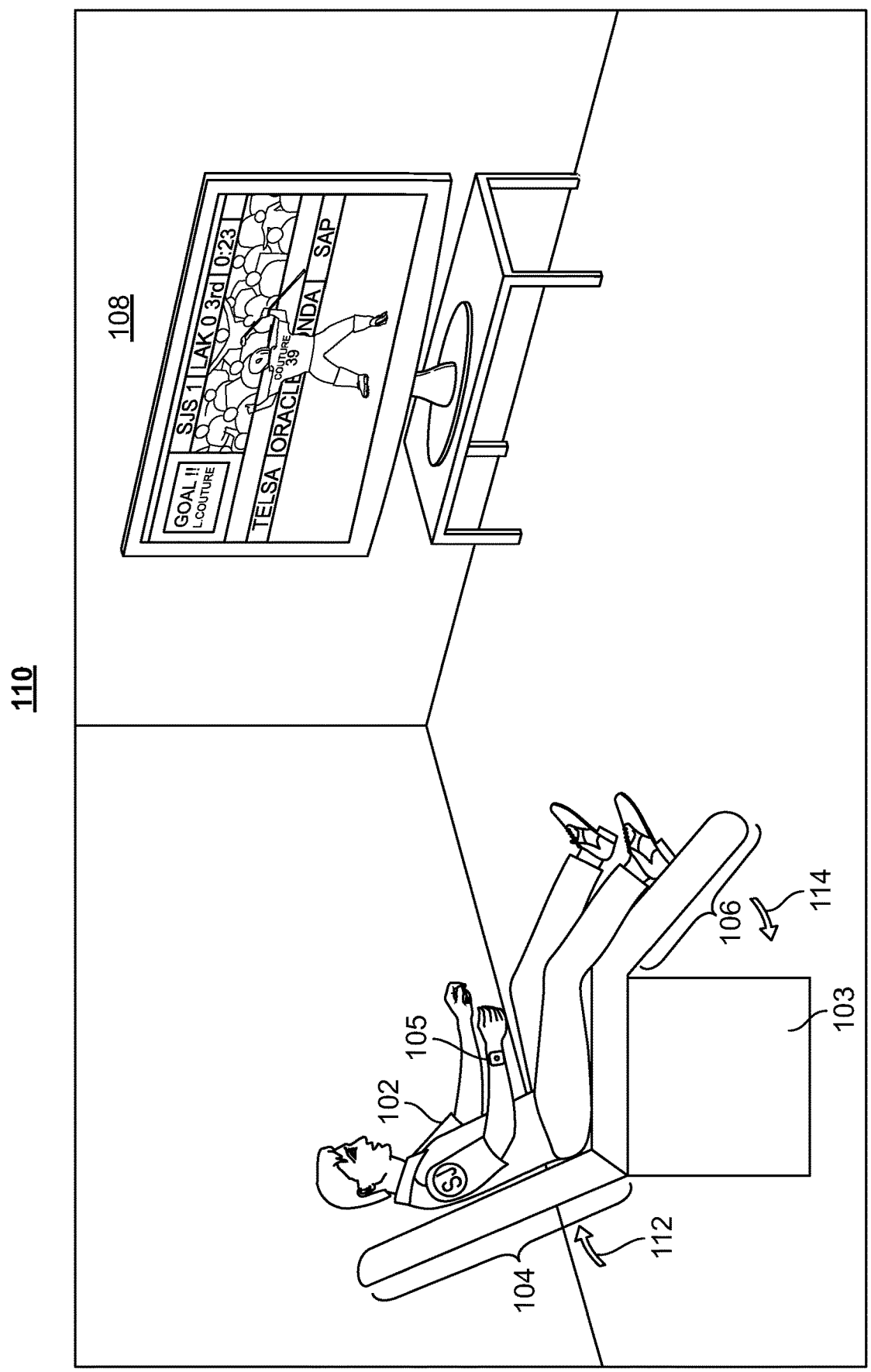
FIG. 1B shows an illustrative embodiment of a user reacting to an event within the media asset whilst interacting with a network-connected object at a second time period.

FIG. 1B shows an illustrative embodiment of a user reacting to an event within the media asset whilst interacting with a network-connected object at a second time period, in accordance with some embodiments of the disclosure. FIG. 1B depicts user equipment 108, which may include control circuitry that executes a media guidance application on any user equipment. The functionality of the user equipment, control circuitry, and the media guidance application is described in further detail below with respect to FIGS. 2-5.

The media guidance application may generate for display a media asset (e.g., a hockey game) on user equipment 108 for a user 102 in environment 110. Environment 100 and 110 may be the same environment (e.g., same living room) at two different times. The hockey game displayed on the user equipment 108 in environment 100 and 110 may be at different times. The hockey game displayed on the user equipment 108 in environment 110 displays a goal being scored. The user 102 reacts to the scored being goal with excitement. User 102 initiates movement to shift posture from a relaxed posture to one of standing. The smartwatch 105 of the user's wrist measures the heart rate of the user 102, where the heart rate is at an increased biometric state from the user's baseline biometric state. The recliner chair 103 may adjust the upper portion 104 and lower portion 106 to a mid-recline configuration setting.

Figure 1C:
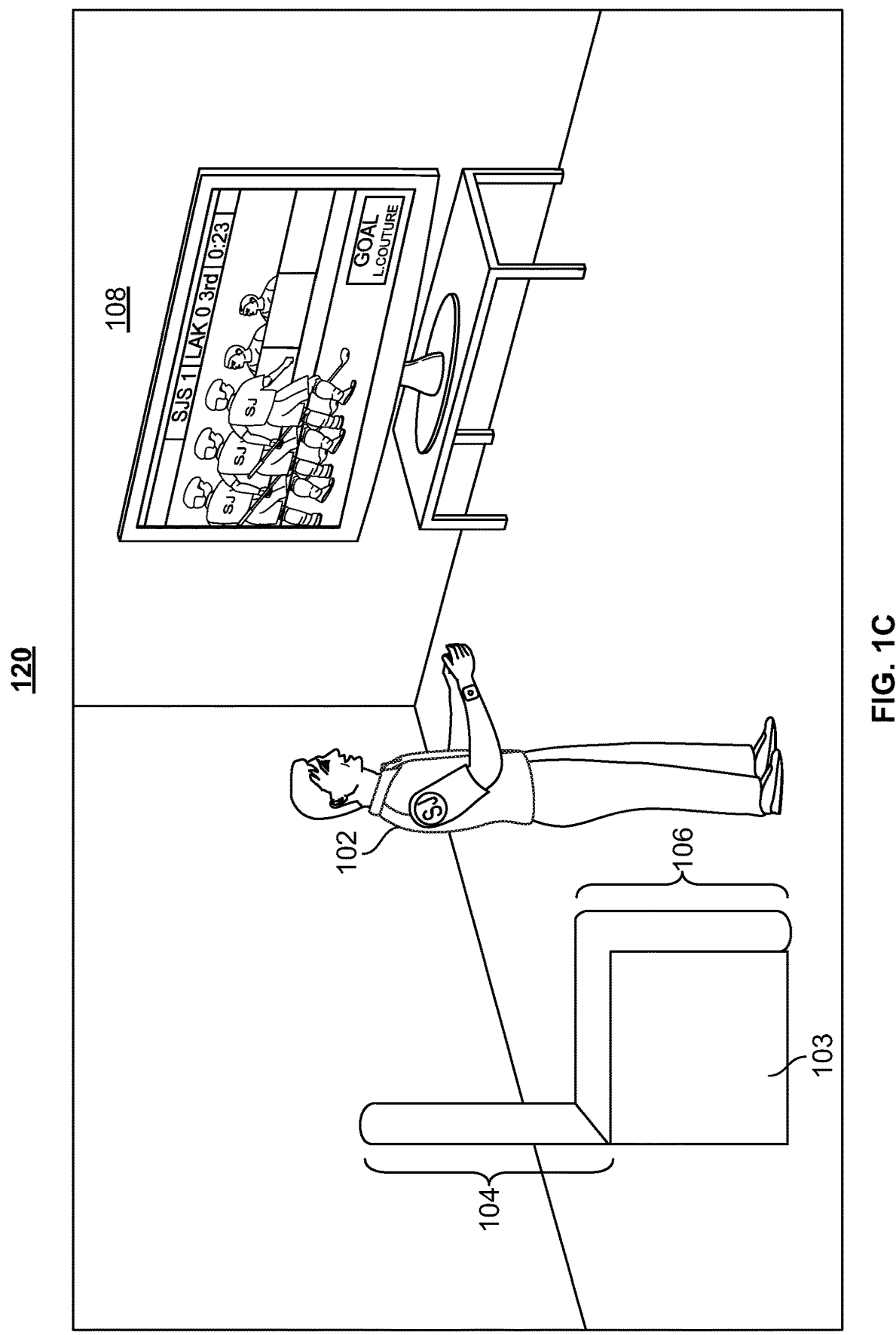
FIG. 1C shows an illustrative embodiment of a user reacting to an event within the media asset whilst interacting with a network-connected object at a third time period.

FIG. 1C shows an illustrative embodiment of a user reacting to an event within the media asset whilst interacting with a network-connected object at a third time period, in accordance with some embodiments of the disclosure. FIG. 1C depicts user equipment 108, which may include control circuitry that executes a media guidance application on any user equipment. The functionality of the user equipment, control circuitry, and the media guidance application is described in further detail below with respect to FIGS. 2-5.

The media guidance application may generate for display a media asset (e.g., a hockey game) implemented on user equipment 108 for a user 102 in environment 120. Environment 100, 110, and 120 may be the same environment (e.g., same living room) at three different time periods. The hockey game displayed on the user equipment 108 in environment 100, 110, and 120 may be at three different times. The hockey game displayed on the user equipment 108 in environment 120 displays the celebration of a goal having been previously scored. The user 102 reacts to the scored goal with heightened excitement. User 102 is standing upright as the goal caused him to leap with excitement from a sitting position to an upright standing and clapping posture. The smartwatch 105 of the user's wrist measures the heart rate of the user 102, where the heart rate is at an increased biometric state from the user's baseline biometric state. The recliner chair 103 may adjust the upper portion 104 and lower portion 106 to an upright configuration setting.

In some embodiments, the media guidance application may store a respective configuration setting of the network-connected object for each of a plurality of events within the media asset and a baseline biometric state of a user. The configuration may be any suitable arrangement of elements of the network-connected object. In some embodiments, for example, it may include any arrangement of mechanical elements in the network-connected object when the mechanical elements are at rest (i.e., not moving). For example, if the network-connected object is a chair with mechanical elements that can recline to a 90 degree resting position, 75 degree resting position, and a 65 degree resting position, the configurations of the network-connected object may correspond to the 90 degree resting position, 75 degree resting position, and a 65 degree resting position. In some embodiments, a configuration may include any arrangement of mechanical elements in the network-connected object that correspond to a factory preset. For example, if the network-connected object is a chair with mechanical elements that can recline to a first resting position, a second resting position, or a third resting position, upon a user selection of preset 1, 2, or 3, respectively, the configurations of the network-connected object may correspond to the first, second, and third resting positions. In some embodiments, a configuration may include any arrangement of mechanical elements in the network-connected object that is maintained for a threshold period of time. For example, if the network-connected object is a chair with mechanical elements that can be manipulated by a user to obtain a state having varying combinations of a particular incline, massage strength, seat warmth, etc., the configurations of the network-connected object may correspond to any state in which the network-connected object remains for the threshold period of time (e.g., 30 seconds). An event may be any occurrence within a media asset. An event may be at any temporal position within the media asset, and in some cases multiple events can occur within a single temporal position within the media asset. In some embodiments, for example, an event may include any and all plays causing a stoppage within a sports match. In some embodiments, an event may be predefined within a particular media asset by the user through the media guidance application. In some embodiments, the media guidance application stores the respective configuration setting in a database. A database may be any storage medium that is communicatively connected to the media guidance application. For example, a database may be part of the user equipment 108 using shared or dedicated memory of the user equipment 108. In other embodiments, the database is a separate storage device communicatively connected to the user equipment 108 by a local area network or a wide area network. The database may store any assortment of information. For example, the database may store information in relation to the particular media asset, configuration settings of one or more network-connected objects, user-specific information and/or metadata, and similar types of information. The following example illustrates user equipment 108 storing configuration settings in a database. A media guidance application (e.g., implemented on user equipment 108) may store a configuration setting of the recliner chair 103 in a database in the event of a goal scored by a team during a hockey game involving the team. Here, the user equipment 108 would store a configuration setting of the recliner chair 103 for a goal event such that the recliner chair 103 adjusts to a configuration setting the upper portion 104 and lower portion 106 to an upright configuration setting.

In some embodiments, the media guidance application may assign each of the plurality of configuration settings to a respective state of the network-connected object in which the network-connected object existed for a threshold period of time after connection to a network of the user. A state of a network-connected object may be any configuration of the network-connected object that is defined as a state in the database by satisfying a threshold period of time. A threshold period of time is the requisite time required for the current configuration of the network-connected object to be defined as a state. In some embodiments, a threshold period of time may be preset by the media guidance application for all events, devices, network-connected objects, and users. In other embodiments, the threshold period of time may be preset by the media guidance application specific to at least one of events, devices, network-connected objects, and users. In yet other embodiments, the threshold period of time may be preset by a third-party network object that is communicatively connected to the media guidance application implemented on the user equipment 108. In an illustrative example, the media guidance application, connected to the same network as the recliner chair 103, may adjust the upper portion 104 and lower portion 106 of the recliner chair 103 to a particular configuration setting. This particular configuration is stored within a database and the corresponding time threshold associated with this configuration may have to exist for 5 seconds for this particular configuration setting to be a respective state.

In some embodiments, the media guidance application may determine that the network-connected object existed in each of the respective states for the threshold period of time by monitoring for a user input entered by the user into the network-connected object, determining that the user input entered by the user resulted in a state of the network-connected object, and recording a length of time until a subsequent user input entered by the user results in a new state of the network-connected object. A user input may be any command, tactile manipulation, gesture, or similar provision interfacing with the network-connected object. For example, continuing from the previous example, the user equipment 108 monitors user input to the recliner chair 103 and determines whether the user input results in a state of the recliner chair 103. In some instances, the media guidance application (e.g., implemented on user equipment 108) also records a length of time until a subsequent user input results in a new state of the recliner chair 103.

In some embodiments, the media guidance application may assign the plurality of configuration settings to mechanical changes in an orientation of the network-connected object. For example, a configuration setting of the recliner chair includes an upper portion 104 and lower portion 106 being adjusted. An adjustment from this configuration setting to another configuration setting (e.g., an upright configuration setting to a full recline configuration setting) corresponds to mechanical changes in the orientation of the recliner chair 103.

In some embodiments, the media guidance application may designate the plurality of configuration settings as one of the plurality of configuration settings by the user. For example, the user 102 may set the recliner chair 103 to remain in an upright configuration setting for all events during display of the hockey game by the media guidance application (e.g., implemented on user equipment 108).

In some embodiments, the media guidance application may generate the media asset for display. For example, the media guidance application (e.g., implemented on user equipment 108) displays a hockey game to the user 102. In some embodiments, the user equipment (e.g., implementing the media guidance application) may generate the media asset for display on a network-connected (or hardwired) display device.

In some embodiments, the media guidance application may detect an event within the media asset. For example, the media guidance application (e.g., implemented on user equipment 108) displays a hockey game to user 102 and may detect a goal being scored within the hockey game. In other instances, a fight that breaks out in the hockey game may be another event. In yet other instances, a penalty taken in the hockey game by a team may be yet another event.

In some embodiments, the media guidance application may, in response to detecting the event within the media asset, retrieve the respective configuration setting of the network-connected object for the event. For example, the media guidance application (e.g., implemented on user equipment 108) displays a hockey game to user 102 where the user is sitting in the recliner chair 103. During display of the hockey game a goal scored is detected. In response to detecting the goal scored, the media guidance application retrieves the respective configuration setting of the recliner chair 103 from a database which and the recliner chair by setting the upper portion 104 and lower portion 106 to an upright configuration setting.

In some embodiments, the media guidance application may, in response to detecting the event within the media asset, send a command to the network-connected object to implement the respective configuration setting. A command may be any data stream that is sent from the media guidance application to the network-connected object. For example, continuing from the previous example, the user equipment 108 sends a command to the recliner chair 103 to implement the respective configuration setting of the recliner chair 103 to adjust the recliner chair setting the upper portion 104 and lower portion 106 to an upright configuration setting.

In some embodiments, the media guidance application may, in response to detecting the event within the media asset, determine whether the user adjusts the respective configuration setting to a new configuration setting within a predefined time of the event. A user adjustment may be a command, tactile manipulation, gesture, or similar provision interfacing with the network-connected object. A predefined time of the event may be predefined by the media guidance application. In other embodiments, the predefined time of the event may be predefined by a user of the media guidance application. In yet other embodiments, associations of predefined times of events may be stored in a database. For example, continuing from the previous example, in response to the goal being detected by the media guidance application (e.g., implemented on user equipment 108), the user 102 alters the recliner chair 103 by tactile manipulation from the upright position (previously implemented in response to the goal scored) to an alternate configuration setting (e.g., such as reverting back to a recline configuration setting where the upper portion 104 and lower portion 106 are in full recline configuration setting). The corresponding predefined time associated with this adjustment by the user is retrieved from a database by the user equipment (e.g., media guidance application) which returns a predefined time of five seconds of the goal being scored. Here, the user adjusted the recliner chair within 5 seconds, and thus a positive determination is made that the user adjusted the configuration setting of the recliner chair 103.

In some embodiments, the media guidance application may determine the predefined time of the event by inputting the event into a database of time thresholds for the user for different events to determine the predefined time corresponding to the event and the user. For example, continuing from the previous example, the user equipment 108 may input the event of a goal scored into a database and receive a time threshold for the event of a goal scored where the time threshold is 5 seconds.

In some embodiments, the media guidance application may determine the predefined time of the event by inputting the event into a database of time thresholds, for the baseline biometric state of the user, for different events to determine the predefined time corresponding to the event and the baseline biometric state of the user. For example, continuing from the previous example, the user equipment 108 may input the event of a goal scored into a database as well as the heart rate of the user 102 and receive a time threshold for the event of a goal scored where the time threshold is 5 seconds.

In some embodiments, the media guidance application may, in response to detecting the event within the media asset, and in further response to determining that the user adjusted the respective configuration setting within a predefined time, retrieve, by the user equipment, a biometric state of the user from a biometric device. A biometric state of a user may be any metric in relation to the physical or mental state of the user. In some embodiments, the biometric state may include vital signs of a user including measurements of a user's pulse, breathing pace, pupil dilation, heart rate, and similar measurements. In other embodiments, a user's biometric state involves measurements derived from a finger-prick blood test of the user, a swab of the user's saliva, a biopsy, and similar measurements. A biometric state may be represented as a single piece of data or a collection of data over time for a specific user. A biometric state may involve computational analysis of one or more of the biometric measurements above to derive a varied biometric state score. For example, the measured biometric state of a user measured over a year may be used to generate a baseline biometric state for the user. A biometric device may be any device which is communicatively connected to user equipment 108 while also facilitating the measurement of a biometric state of the user. For example, a biometric device may be a network-connected smartwatch, mobile phone, computer, tablet (e.g., which all have the ability to take a biometric measurement such as a user's pulse). In other embodiments, biometric devices include a network-enabled portable wrist pulse detector, network-enabled nodes attached to a user's chest to monitor heart rate, a network-enabled finger-prick device to measure blood of a user, and similar devices. For example, continuing from the previous example, in response to a positive determination that the user adjusted the configuration setting of the recliner chair 103, the heart rate of the user 102 is retrieved from the smartwatch 105 worn by the user 102, the smartwatch mounted on the user's wrist having embedded capabilities to measure the user's pulse.

In some embodiments, the media guidance application may, in response to detecting the event within the media asset, determine, by the user equipment, whether the biometric state corresponds to the baseline biometric state. A baseline biometric state may be a predefined biometric state of the user. In some embodiments, the baseline biometric state is used for comparison to a measured biometric state. A baseline biometric state may be stored in a database for a specific user. The biometric state may be data from a third-party database (e.g., health insurance database, hospital database, electronic medical records database). As mentioned above, the measured biometric state of a user measured over a year may be used to generate a baseline biometric state for the user. For example, continuing from the previous example, the retrieved heart rate of the user 102 is compared against a baseline heart rate of the user 102.

In some embodiments, the media guidance application may, in response to detecting the event within the media asset, and further in response to determining that the biometric state does not correspond to the baseline biometric state, replace the respective configuration setting with the new configuration setting. For example, continuing from the previous example, if the media guidance application determines that the retrieved heart rate of the user 102 previously retrieved is not corresponding to the baseline heart rate of the user 102, the media guidance application replaces the respective configuration setting of the recliner chair 103 (e.g., upright configuration setting) with the current configuration setting (e.g., full recline setting).

In some embodiments, the media guidance application may, in response to determining that the biometric state does not correspond to the baseline biometric state, increase, in the database, a record of a number of times the user adjusted the respective configuration setting to a new configuration setting within the predefined time. Further, the user equipment may determine, for the event, whether the increased record exceeds a threshold number, wherein the respective configuration setting is replaced with the new configuration setting in response to determining that the increased record exceeds a threshold number. For example, continuing from the previous example, in this embodiment, the replacement of the current configuration setting would not occur unless the user 102 adjusted the recliner chair 3 times from the upright configuration setting to the full recline configuration setting within 5 seconds every time the same team scores a goal. The threshold number for the goal event for the hockey game was set to 3. Therefore, in this example, the media guidance application replaces the respective configuration setting of the recliner chair 103 (e.g., upright configuration setting) with the current configuration setting (e.g., full recline setting) upon the third occurrence of a goal scored by a team.

In some embodiments, the media guidance application may, in response to determining that the biometric state does correspond to the baseline biometric state, not increase, in the database, a record of a number of times the user adjusted the respective configuration setting to a new configuration setting within the predefined time. For example, continuing from the previous example, in this embodiment, if a goal was scored but the heart rate of the user 102 retrieved from the smartwatch 105 corresponded to the baseline heart rate of the user 102, then the media guidance application would not increase the record number.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
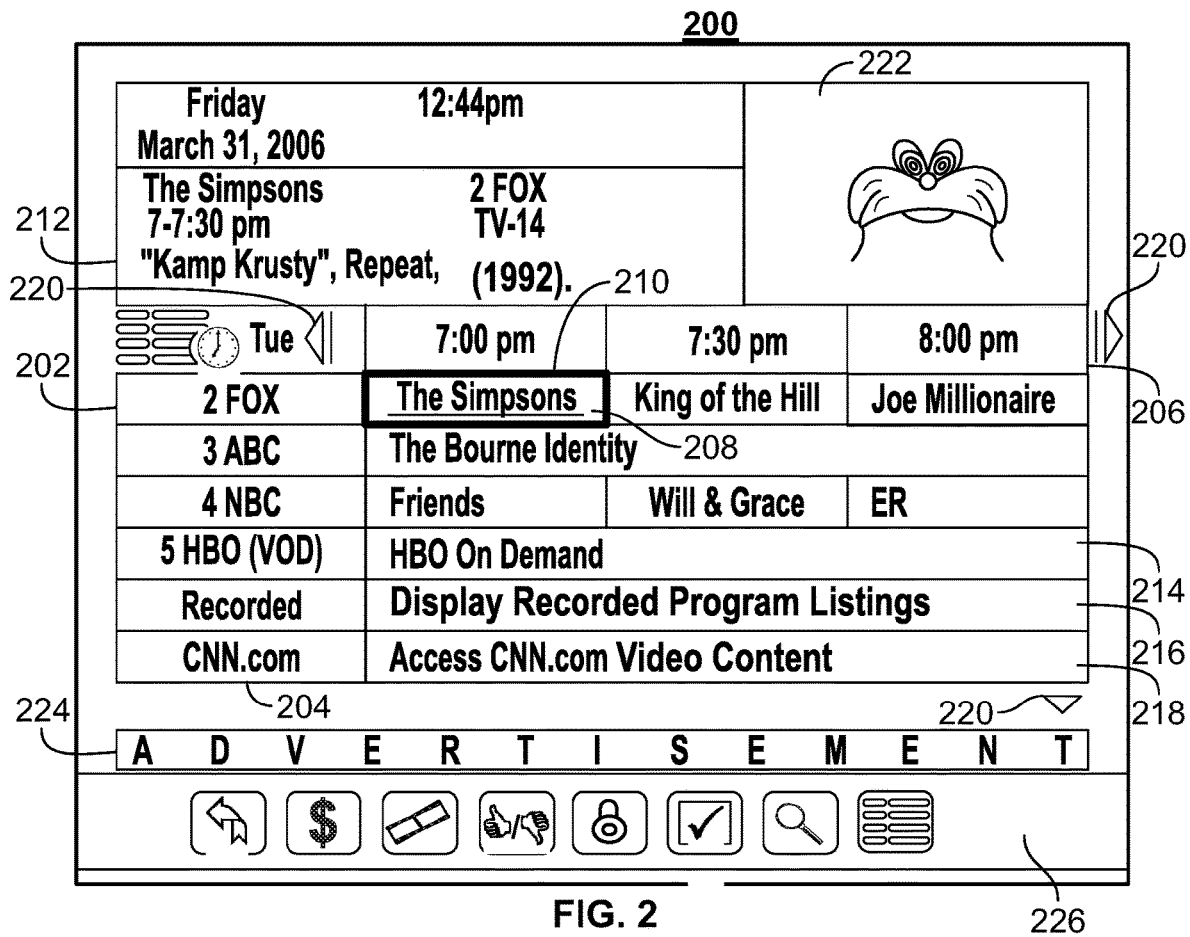
FIG. 2 shows an illustrative embodiment of a display screen that may be used to provide media guidance application listings and other media guidance information, in accordance with some embodiments of the disclosure.
Figure 3:
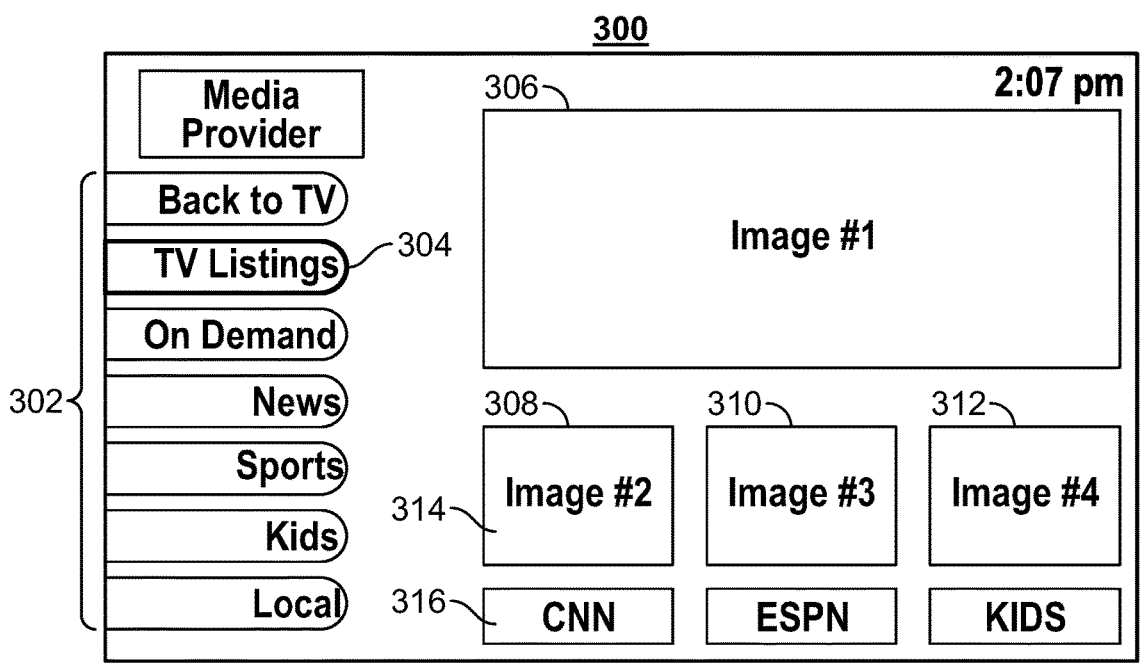
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
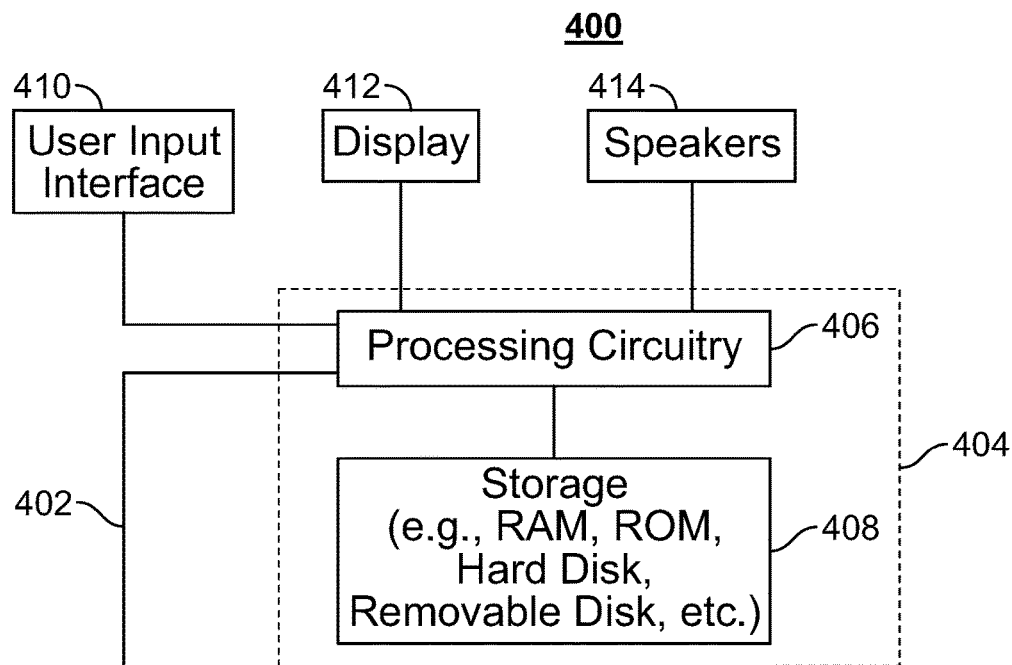
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D.

A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may generate for display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
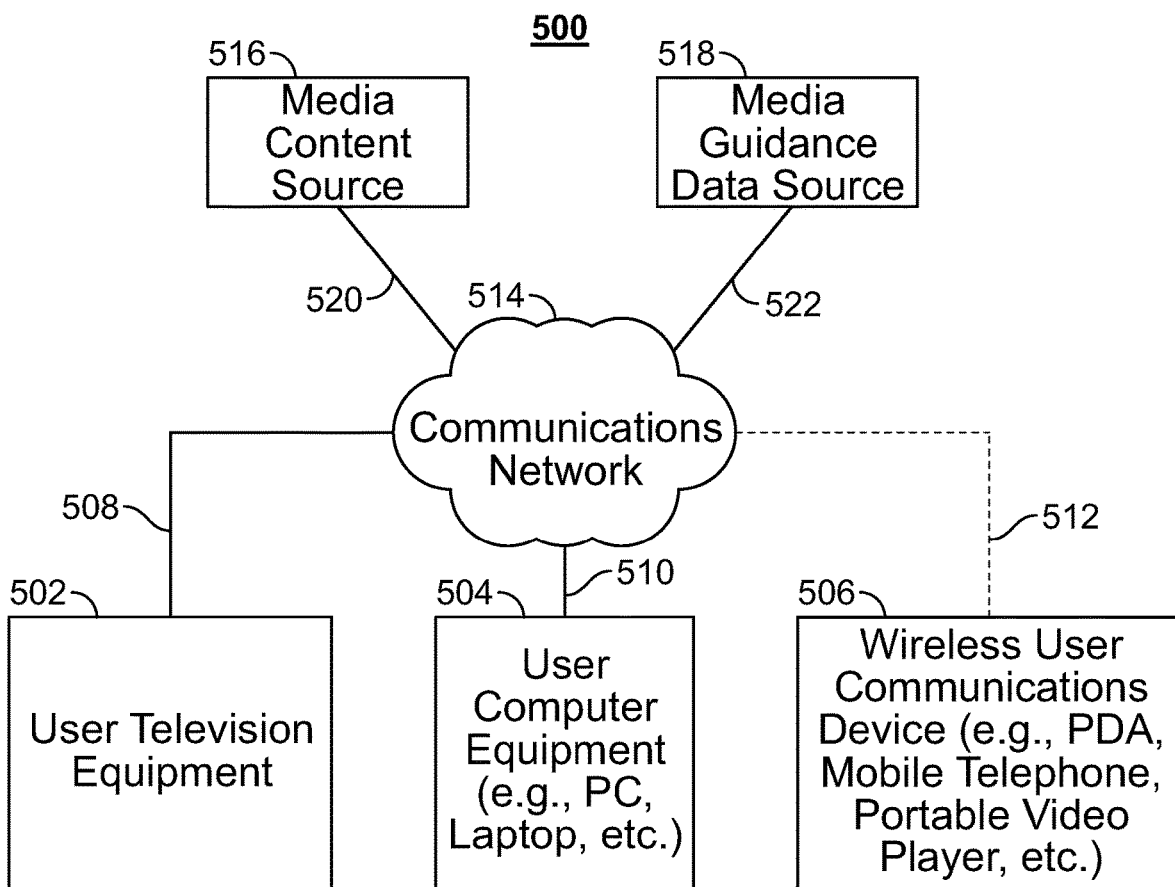
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
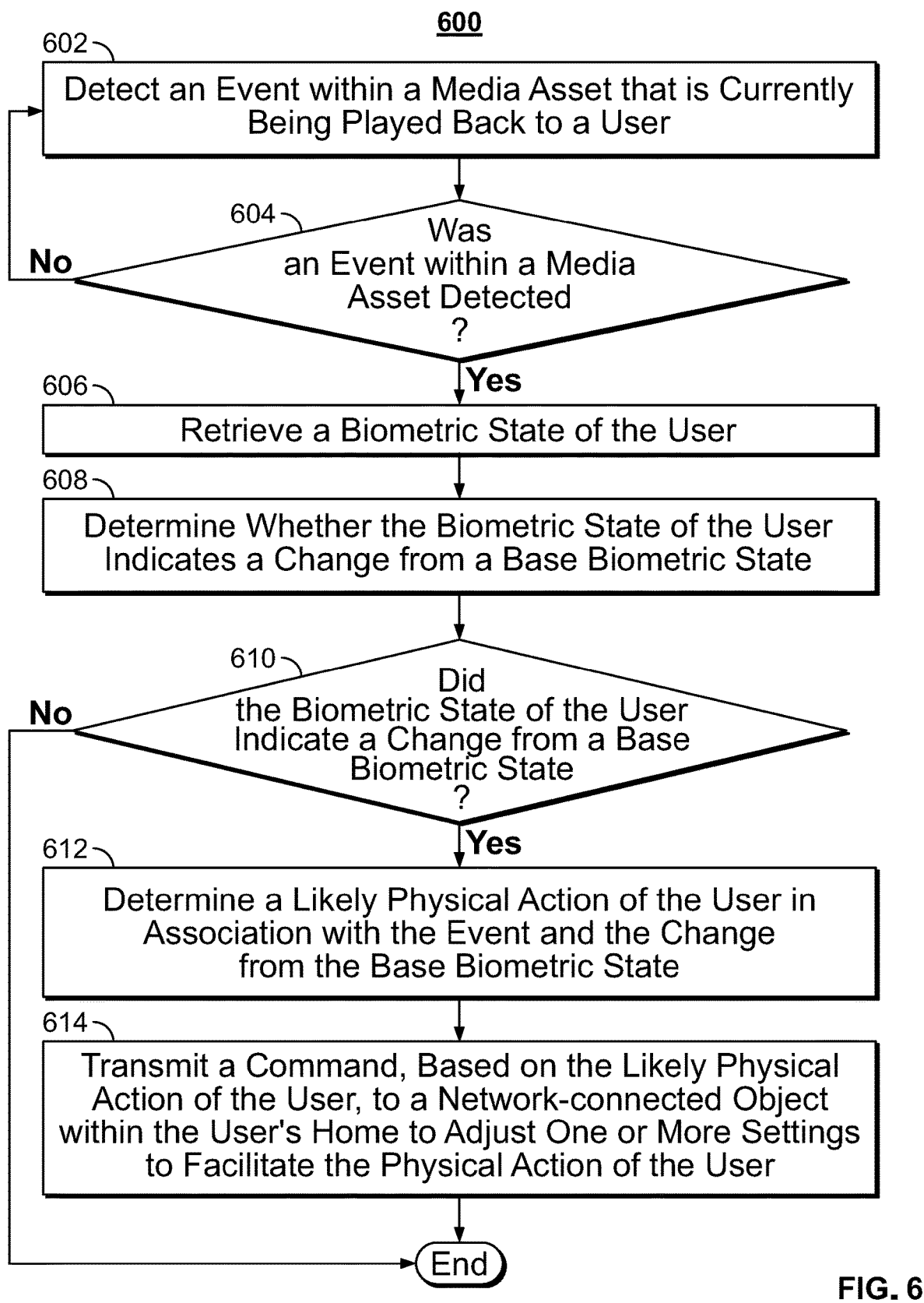
FIG. 6 is a flowchart of a process for representing adjusting an Internet of Things device based on user reaction to events in media to facilitate a physical action of the user.

FIG. 6 depicts an illustrative flowchart of a process 600 for adjusting an Internet of Things device based on user reaction to events in media to facilitate a physical action of the user, in accordance with some embodiments of the disclosure. Process 600, and any of the following processes, may be executed by control circuitry 404 (e.g., in a manner instructed to control circuitry 404 by the media guidance application). Control circuitry 404 may be part of user equipment (e.g., user equipment 108, which may have any or all of the functionality of user television equipment 502, user computer equipment 504, and/or wireless communications device 506), or of a remote server separated from the user equipment by way of communication network 514, or distributed over a combination of both.

At 602, a control circuitry 404 detects an event within a media asset (e.g., a sporting event being broadcast on television) that is currently being played back to the user. For example, the media guidance application (e.g., implemented on user equipment 108) detects a goal (e.g., an event) in a hockey game (e.g., a media asset).

At 604, control circuitry 404, namely, the media guidance application (e.g., implemented by the user equipment 108), detects whether an event was detected within the media asset. The media guidance application, through control circuitry 404, retrieves information from the user equipment 108 regarding the media asset and detects whether the information contains an event within the media asset currently being played back to the user. If, at 604, control circuitry 404 determines that "No", an event was not detected, the process reverts to 602.

If, at 604, control circuitry 404 detects that "Yes", an event was detected within the media asset, process 604 proceeds to 606. At 606, the media guidance application, by control circuitry 404, retrieves a biometric state of the user.

At 608, the media guidance application, by control circuitry 404, determines whether the biometric state of the user indicates a change from a base biometric state.

At 610, the media guidance application, by control circuitry 404, determines whether the biometric state of the user indicates a change from a base biometric state. If, at 610, the media guidance application determines that "No", there is not an indication of change in the biometric state of the user from a base biometric state, process proceeds to "End".

If, at 610, the media guidance application, by control circuitry 404, determines that "Yes", there is an indication of change in the biometric state of the user from a base biometric state, process 610 proceeds to 612.

At 612, the media guidance application, by control circuitry 404, determines a likely physical action of the user in association with the event and the change from the base biometric state. The media guidance application determines the likely physical action by sending a request to a database including the event, and user-based metadata. The media guidance application receives the corresponding likely physical action of the user.

At 614, the media guidance application, by control circuitry 404, transmits a command, based on the likely physical action of the user, to a network-connected object within the user's home, to adjust one or more settings to facilitate the physical action of the user.

Figure 7:
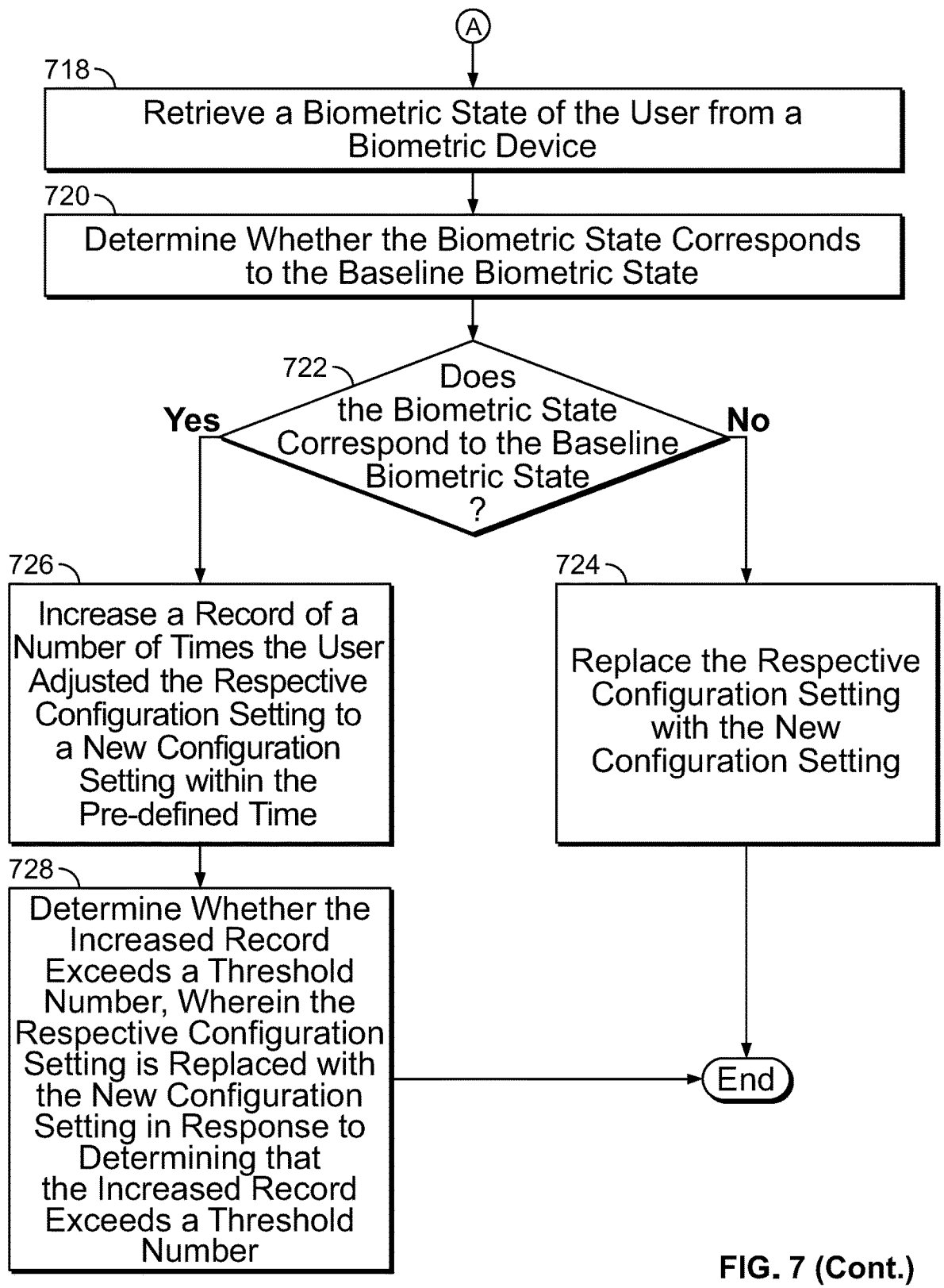
FIG. 7 is a flowchart of a process for representing the training of network-connected objects to provide configurations in association with events within media assets.

FIG. 7 depicts an illustrative flowchart of a process 700 representing training network-connected objects to provide configurations in association with events within media assets, in accordance with some embodiments of the disclosure. At 702, the media guidance application, implemented by user equipment using control circuitry 404, stores a respective configuration setting of the network-connected object for each of a plurality of events within the media asset and a baseline biometric state of a user. Control circuitry 404 assigns each of the plurality of configuration settings to a respective state of the network-connected object in which the network-connected object existed for a threshold period of time after connection to a network of the user. Control circuitry 404 assigns each of the plurality of configuration settings to mechanical changes in an orientation of the network-connected object. Control circuitry 404 designates each of the plurality of configuration settings as one of the plurality of configuration settings by the user.

At 704, the media guidance application, by control circuitry 404, generates the media asset for display. In some embodiments, the generation of a media asset is displayed in response to a command by the user to the media guidance application to display a selected media asset. For example, the user may be browsing an electronic program guide on the media guidance application and select a particular hockey game that is currently available for viewing. In response to the user selection, the media guidance application, through control circuitry, generates for display this selected hockey game.

At 706, the media guidance application, by control circuitry 404, detects an event within the media asset. In some embodiments, events are detected by the media guidance application implementing comparative analysis using closed-captioning information. The corresponding closed-captioning information associated with the media asset is taken by the media guidance application and compared by analyzing the text with a set of predefined event trigger words for that particular asset. In response to the closed captioning text matching one of the predefined event trigger words, the media guidance application detects an event. In other embodiments, image capture analysis is implemented by the media guidance application where known image capture techniques are implemented to continually compare the playing media asset with event detection criteria, and in response to a match between the specific image capture and the event detection criteria, the media guidance application detects an event. In yet other embodiments, the media guidance application processes metadata associated with the media assets, where the media assets include information within the metadata regarding each temporal instance of the media asset (e.g., information relating to every timestamp of the media content). If this metadata is compared by the media guidance application to a predefined set of information defining events for the particular media asset, events can be detected upon position matching of metadata associated with one or more specific temporal instances of the media asset and the predefined set of information defining events.

At 708, the media guidance application, by control circuitry 404, detects whether an event within the media asset was detected. If, at 708, the media guidance application detects that "No", an event within the media asset was not detected, process reverts to 706.

If, at 708, the media guidance application detects that "Yes", an event within the media asset was detected, process proceeds to 710. At 710, the media guidance application, by control circuitry 404, retrieves the respective configuration setting of the network-connected object for the event from the database. In some embodiments, the database is embedded in the user equipment. In other embodiments, the database is communicatively coupled to the user equipment (e.g., connectivity through WAN or LAN).

At 712, the media guidance application, by control circuitry 404, sends a command to the network-connected object to implement the respective configuration setting. For example, a user is watching a hockey match while sitting in a network-connected recliner chair and an event of a goal being scored is detected by the team that the user supports. The media guidance application sends a command to the recliner chair (which is connected to the media guidance application on the LAN of the house), where the command implements the configuration of the recliner chair to maintain the current reclined configuration setting.

At 714, the media guidance application, by control circuitry 404, determines whether the user has adjusted the respective configuration setting to a new configuration setting within a predefined time of the event. The media guidance application determines the predefined time of the event by inputting the event into a database of time thresholds for the user for different events to determine the predefined time corresponding to the event and the user. In some embodiments, the media guidance application, by control circuitry 404, also determines the predefined time of the event by inputting the event into a database of time thresholds, for the baseline biometric state of the user, for different events to determine the predefined time corresponding to the event and the baseline biometric state of the user.

At 716, the media guidance application, by control circuitry 404, determines whether the user adjusts the respective configuration setting to a new configuration setting. If, at 716, the media guidance application determines that "No", the user did not adjust the respective configuration setting to a new configuration setting, process proceeds to "End".

If, at 716, the media guidance application determines that "Yes", the user adjusted the respective configuration setting to a new configuration setting, process proceeds to 718. At 718, the media guidance application, by control circuitry 404, retrieves a biometric state of the user from a biometric device. In some embodiments, respective multiple biometric states are retrieved by the media guidance application from corresponding multiple biometric devices. For example, a user is wearing a smartwatch measuring the user's heart rate, while smart glasses measure the user's pupil dilation. Both the heart rate and pupil dilation information are retrieved by the media guidance application.

At 720, the media guidance application, by control circuitry 404, may determine whether the biometric state corresponds to the baseline biometric state. In some embodiments, correspondence of the biometric state to the baseline biometric state is accomplished through implementing acceptable variation with predefined tolerances by the media guidance application. In some embodiments, the predefined tolerances are based on third-party tolerances (e.g., medical journals, government health agencies, and the like). In other embodiments, the predefined tolerances are based on a record of measured biometric states of the specific user and a tolerance level calculated from only the record of the specific user.

At 722, the media guidance application, by control circuitry 404, determines whether the biometric state corresponds to the baseline biometric state. If, at 722, the media guidance application determines that "No", the biometric state does not correspond to the baseline biometric state, process proceeds to 724. At 724, the media guidance application, by control circuitry 404, replaces the respective configuration setting with the new configuration setting. In some embodiments, the media guidance application increases, in the database, a record of a number of times the user adjusted the respective configuration setting to a new configuration setting within the predefined time in response to determining that the biometric state does not correspond to the baseline biometric state.

If, at 722, the media guidance application determines that "Yes", the biometric state does correspond to the baseline biometric state, process proceeds to 726. At 718, the media guidance application, by control circuitry 404, retrieves a biometric state of the user from a biometric device. The media guidance application does not increase, in the database, a record of a number of times the user adjusted the respective configuration setting to a new configuration setting within the predefined time threshold of the event in response to determining that the biometric state does correspond to the baseline biometric state.

Figure 8:
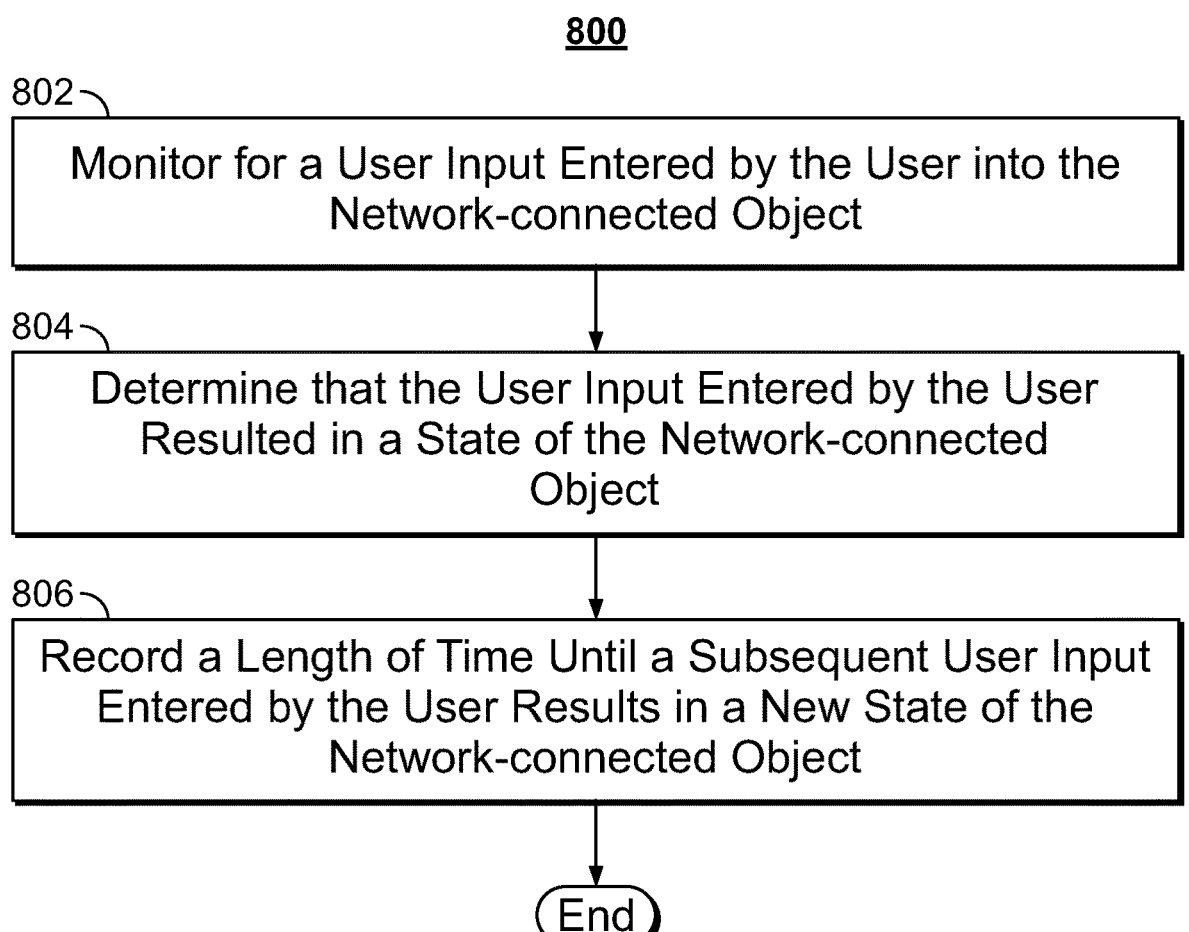
FIG. 8 is a flowchart of a process for representing the determining of a network-connected object existing in respective states for a threshold period of time.

FIG. 8 depicts an illustrative flowchart of a process 800 representing determining that a network-connected object existed in respective states for a threshold period of time, in accordance with some embodiments of the disclosure. At 802, the media guidance application, by control circuitry 404, monitors for a user input entered by the user into the network-connected object. For example, the user physically pushes the lower section of the footrest of a network-connected object to revert from reclined configuration setting to upright configuration setting, this would be an input monitored by the media guidance application. The recliner chair monitors the upright configuration for a threshold period of time.

At 804, the media guidance application, by control circuitry 404, determines that the user input entered by the user resulted in a state of the network-connected object. In some embodiments, the media guidance application polls the network-connected device at a frequency requesting status of current states. In other embodiments, the media guidance application receives updates from the network-connected object as soon as the object experiences a state change.

At 806, the media guidance application, by control circuitry 404, records a length of time until a subsequent user input entered by the user results in a new state of the network-connected object. For example, the user adjusts the top seat recliner portion of a network-connected recliner chair gradually from 90 degrees to 45 degrees in a gradual motion. Each degree between 90 to 45 is not a state change as the threshold period of time measured by the media guidance application has not been met. Accordingly, the process described provides that only actual states are determined and no superfluous states, which enhances the efficiency of the described process.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1A, 1B, 1C, and 4-5 could be used to perform one or more of the steps in FIGS. 6-8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method for training network-connected objects to provide configurations in association with events within a media asset, the method comprising: storing, in a database, a respective configuration setting, of a plurality of configuration settings, of the network-connected object for each of a plurality of events within the media asset and a baseline biometric state of a user;

generating, for display by a user equipment, the media asset;

detecting, by the user equipment, an event within the media asset; and in response to detecting the event within the media asset:

retrieving, from the database, the respective configuration setting of the network connected object for the event;

sending a command, by the user equipment, to the network-connected object to implement the respective configuration setting;

determining, by the user equipment, whether the user uses a user interface to adjust the respective configuration setting to a new configuration setting, of a plurality of configuration settings, within a predefined time after the event;

in response to determining that the user adjusted the respective configuration setting within the predefined time, retrieving, by the user equipment, a biometric state of the user from a biometric device;

determining, by the user equipment, whether the biometric state corresponds to the baseline biometric state; and in response to determining that the biometric state does not correspond to the baseline biometric state, replacing the respective configuration setting with the new configuration setting.

2. The method of claim 1, further comprising:

in response to determining that the biometric state does not correspond to the baseline biometric state, increasing, in the database, a record of a number of times the user adjusted the respective configuration setting to a new configuration setting within the predefined time; and determining, by the user equipment, for the event, whether the increased record exceeds a threshold number, wherein the respective configuration setting is replaced with the new configuration setting in response to determining that the increased record exceeds a threshold number.

3. The method of claim 2, further comprising not increasing, in the database, a record of a number of times the user adjusted the respective configuration setting to a new configuration setting within the predefined time threshold of the event in response to determining that the biometric state does correspond to the baseline biometric state.

4. The method of claim 1, wherein the predefined time of the event is determined by inputting the event into a database of time thresholds for the user for different events to determine the predefined time corresponding to the event and the user.

5. The method of claim 1, wherein the predefined time of the event is determined by inputting the event into a database of time thresholds, for the baseline biometric state of the user, for different events to determine the predefined time corresponding to the event and the baseline biometric state of the user.

6. The method of claim 1, wherein each of the plurality of configuration settings corresponds to a respective state of the network-connected object in which the network connected object existed for a threshold period of time after connection to a network of the user.

7. The method of claim 6, further comprising determining that the network connected object existed in each of the respective states for the threshold period of time by:

monitoring for a user input entered by the user into the network-connected object;

determining that the user input entered by the user resulted in a state of the network connected object; and recording a length of time until a subsequent user input entered by the user results in a new state of the network-connected object.

8. The method of claim 6, further comprising determining that the network connected object existed in each of the respective states for the threshold period of time by:

monitoring the network-connected object for a mechanical change resulting in a new orientation of the network-connected object; and determining that the network-connected object remained in the new orientation for a threshold amount of time.

9. The method of claim 1, wherein each of the plurality of configuration settings corresponds to mechanical changes in an orientation of the network-connected object.

10. The method of claim 1, wherein each of the plurality of configuration settings is designated as one of the plurality of configuration settings by the user.

11. The method of claim 1, wherein the user interface is at least one of: a remote control, a mouse, a trackball, a keypad, a keyboard, a touch screen, a touchpad, a stylus input, a joystick, or a voice recognition interface.

12. A system for training network-connected objects to provide configurations in association with events within a media asset, the system comprising:

a database configured to store a respective configuration setting, of a plurality of configuration settings, of the network-connected object for each of a plurality of events within the media asset and a baseline biometric state of a user; and control circuitry configured to:

generate, the media asset;

detect an event within the media asset; and in response to detection of the event within the media asset:

retrieve, from the database, the respective configuration setting of the network-connected object for the event;

send a command to the network-connected object to implement the respective configuration setting;

determine whether the user uses a user interface to adjust the respective configuration setting to a new configuration setting, of a plurality of configuration settings, within a predefined time after the event;

in response to the determination that the user adjusted the respective configuration setting within the predefined time, retrieve a biometric state of the user from a biometric device;

determine whether the biometric state corresponds to the baseline biometric state; and in response to the determination that the biometric state does not correspond to the baseline biometric state, replace the respective configuration setting with the new configuration setting.

13. The system of claim 12, wherein the control circuitry is further configured to:

increase, in the database, a record of a number of times the user adjusted the respective configuration setting to a new configuration setting within the predefined time in response to the determination that the biometric state does not correspond to the baseline biometric state; and determine, for the event, whether the increased record exceeds a threshold number, wherein the respective configuration setting is replaced with the new configuration setting in response to the determination that the increased record exceeds a threshold number.

14. The system of claim 13, wherein the control circuitry is further configured to not increase, in the database, the record of a number of times the user adjusted the respective configuration setting to the new configuration setting within the predefined time threshold of the event in response to a determination that the biometric state does correspond to the baseline biometric state.

15. The system of claim 12, wherein the control circuitry is further configured to determine the predefined time of the event by inputting the event into a database of time thresholds for the user for different events to determine the predefined time corresponding to the event and the user.

16. The system of claim 12, wherein the control circuitry is further configured to determine the predefined time of the event by inputting the event into a database of time thresholds, for the baseline biometric state of the user, for different events to determine the predefined time corresponding to the event and the baseline biometric state of the user.

17. The system of claim 12, wherein each of the plurality of configuration settings corresponds to a respective state of the network-connected object in which the network connected object existed for a threshold period of time after connection to a network of the user.

18. The system of claim 17, wherein the control circuitry is further configured to:
monitor for a user input entered by the user into the network-connected object;
determine that the user input entered by the user resulted in a state of the network connected object; and
record a length of time until a subsequent user input entered by the user results in a new state of the network-connected object.

19. The system of claim 17, wherein the control circuitry is further configured to:
monitor the network-connected object for a mechanical change resulting in a new orientation of the network-connected object; and
determine that the network-connected object remained in the new orientation for a threshold amount of time.

20. The system of claim 12, wherein each of the plurality of configuration settings corresponds to mechanical changes in an orientation of the network-connected object.

21. The system of claim 12, wherein each of the plurality of configuration settings is designated as one of the plurality of configuration settings by the user.

22. The system of claim 12, wherein the user interface is at least one of: a remote control, a mouse, a trackball, a keypad, a keyboard, a touch screen, a touchpad, a stylus input, a joystick, or a voice recognition interface.

* * * * *